United States Patent [19]
Banks

[11] 3,710,388
[45] Jan. 9, 1973

[54] RADAR SCANNING METHOD AND APPARATUS

[75] Inventor: Donald S. Banks, Wellesley, Mass.

[73] Assignee: Raytheon Company, Lexington, Mass.

[22] Filed: Aug. 6, 1970

[21] Appl. No.: 61,553

[52] U.S. Cl. ..............................................343/16 R
[51] Int. Cl. ................................................G01s 9/02
[58] Field of Search............343/16 R, 100 SA, 16 LS

[56] References Cited

UNITED STATES PATENTS

| | | | |
|---|---|---|---|
| 3,307,183 | 2/1967 | Adam | 343/16 R |
| 3,305,867 | 2/1967 | Miccioli et al. | 343/100 SA |
| 3,406,399 | 10/1968 | Alsberg | 343/16 R |
| 3,403,401 | 9/1968 | Cragon et al. | 343/100 SA |
| 3,560,978 | 2/1971 | Himmel et al. | 343/100 SA X |

*Primary Examiner*—Malcolm F. Hubler
*Attorney*—Philip J. McFarland and Joseph D. Pannone

[57] ABSTRACT

Apparatus and method for measuring the angular deviation of targets from the boresight line of a radar antenna wherein the phase center of such antenna is moved about the boresight to impress a Doppler shift signal on the signals from all targets within the beam of such antenna, the characteristics of such shift signal being indicative of the angular deviation of each one of the targets from the boresight line.

10 Claims, 11 Drawing Figures

SHEET 1 OF 3
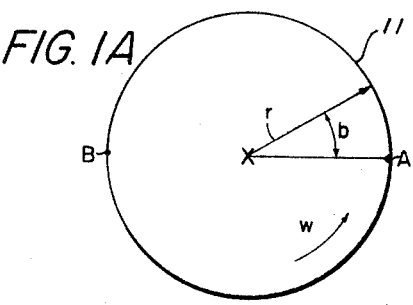
FIG. 1A
FIG. 1B
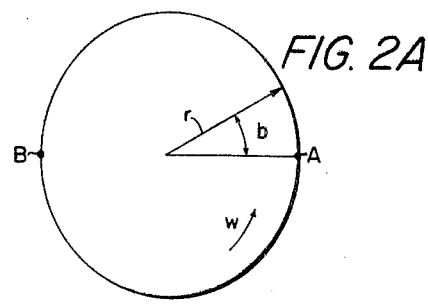
FIG. 2A
FIG. 2B
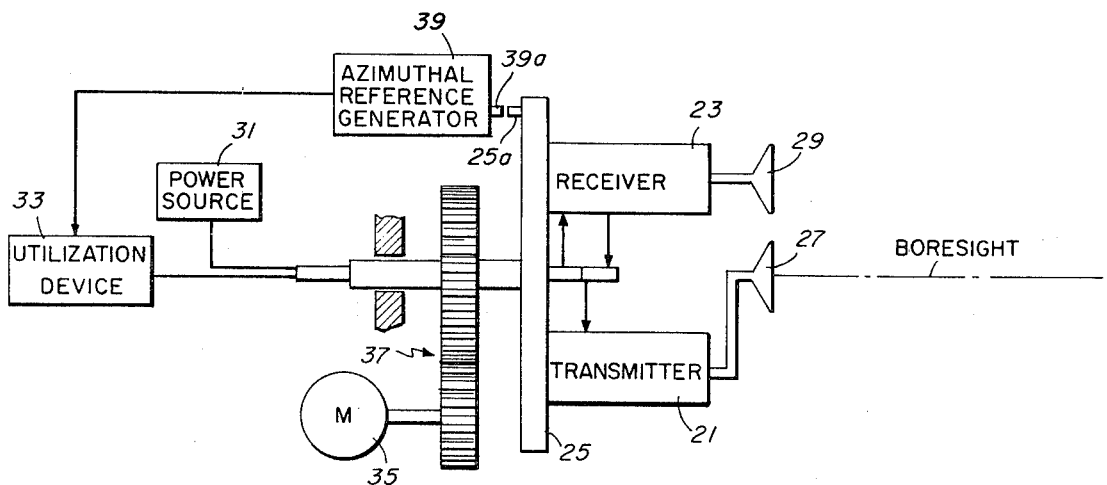
FIG. 3
INVENTOR
DONALD S. BANKS

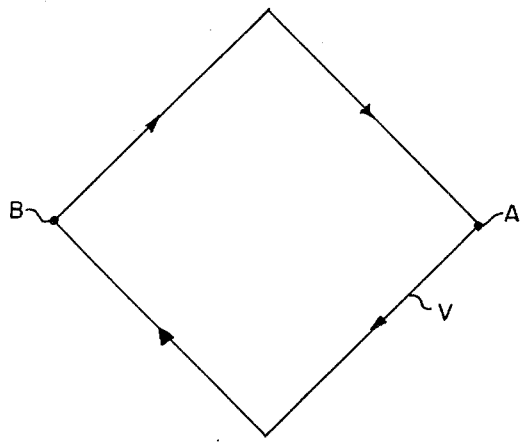
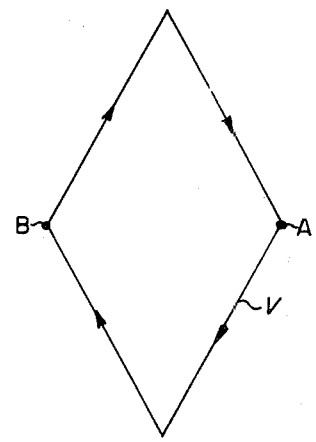
FIG. 4A
FIG. 5A
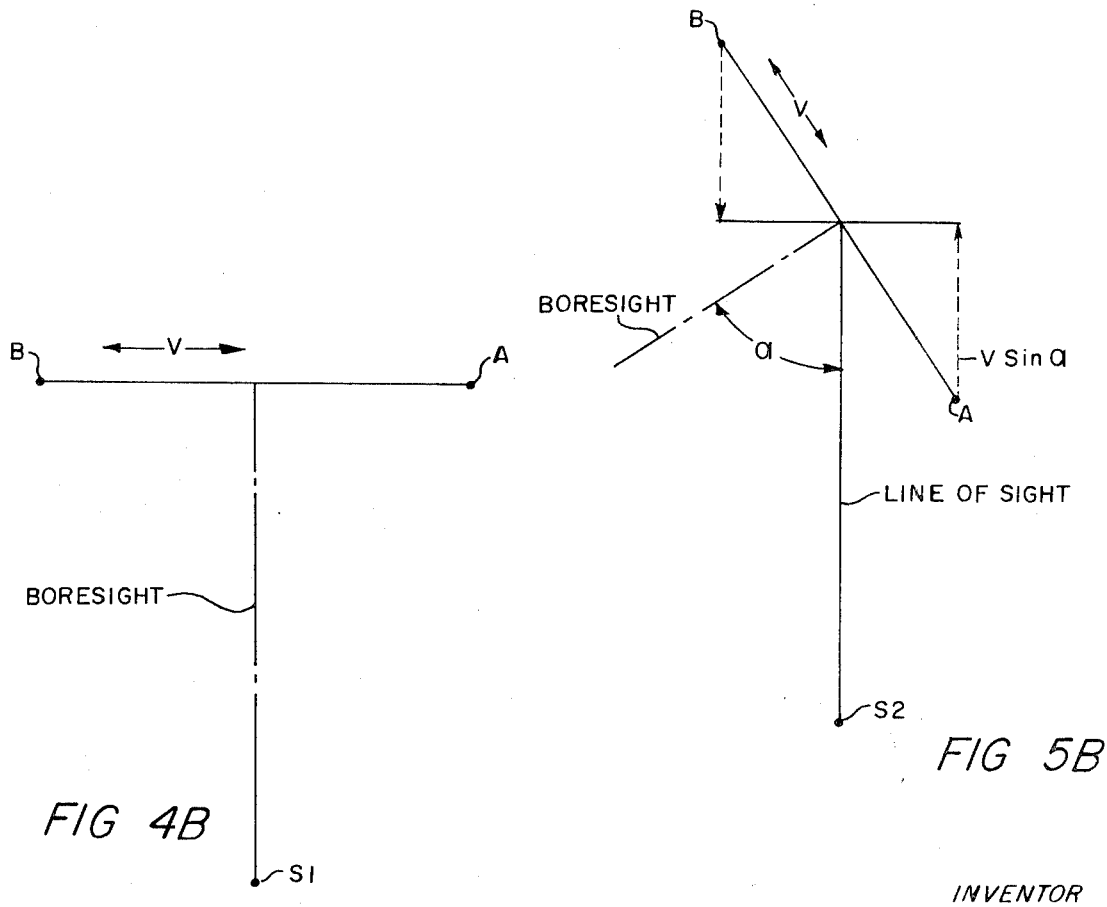
FIG 4B
FIG 5B
INVENTOR
DONALD S. BANKS

RADAR SCANNING METHOD AND APPARATUS

BACKGROUND OF THE INVENTION

This invention pertains generally to radar scanning apparatus and method and particularly to apparatus and method for determining the angle between any target and the boresight line of the directional antenna of a radar system.

It is known in the radar art that so-called conical scanning of a radar beam may be used to permit tracking of a target. When such a scanning system is used, a small angular deviation is created between the centerline of the radar beam and the boresight line of the radar antenna so that when the centerline is rotated about the boresight line the locus of such centerline is a cone. Therefore, the amplitude of echo signals from a target off boresight varies periodically in accordance with the angular deviation of the target from the boresight line of the radar antenna. While conical scanning systems are satisfactory for many applications, the fact that the amplitude modulation of any echo signal is the parameter from which the angular deviation of a target is derived requires transmitting and receiving elements which introduce insignificant amounts of amplitude distortion. The receiving elements, especially, must be linear over a wide dynamic range to avoid unacceptable intermodulation.

It is also known in the radar art that so-called monopulse systems may be used to determine the angular deviation of a target from the boresight line of a radar antenna. In many known systems of such type, the angular deviation of a target is determined by measuring the phase difference between echo signals received simultaneously by two, or more, stationary receiving antennas which are displaced one from the other by a fixed distance. Again, while such systems have many applications, their usefulness is limited to applications in which the complexities introduced by the requirement of processing simultaneously received signals may be accepted.

It is also known in the art that echo signals from targets on the boresight line of a radar antenna may be distinguished from some echo signals from targets off the boresight line. Thus, if the phase center of the radar antenna is moved in a line in the plane defined by the boresight line of the radar antenna and the line of sight between the radar and a target off the boresight line, the echo signals from such a target will be frequency modulated. It follows then that such echo signals may be distinguished from unmodulated echo signals (which are assumed to be from a target on the boresight line) by suitable filtering. It should be noted, however, that the amount of frequency modulation impressed on the echo signals from a target off the boresight line decreases, even though the angular deviation of such target from the boresight line of the radar antenna remains constant, as the position of the target moves from the plane defined by the boresight line of the radar antenna and the line of sight to the target. In other words, the position of the target with respect to the boresight line, i.e., whether the target is to the "left" or "right" or whether the target is "up" or "down" with respect to the boresight line (which position is referred to hereinafter as "asimuthal" position of the target) affects the accuracy of measurement.

Therefore, it is an object of this invention to provide a scanning technique for measurement of deviation angle of a target from the boresight line of a radar antenna which is not sensitive to changes in amplitude of echo signals;

Another object of this invention is to provide a scanning technique for measurement of deviation angle of a target from the boresight line of a radar antenna by measuring changes in phase of the echo signals from such target without requiring simultaneous processing of a plurality of signals;

Still another object of this invention is to provide a scanning technique for measurement of the deviation angle of a target from the boresight line of a radar antenna which is equally sensitive however the position of the target changes about the boresight line.

SUMMARY OF THE INVENTION

These and other objects of this invention are generally attained by providing a receiving antenna whose phase center is displaced from the boresight line and may be moved in a plane orthogonal to such line. In one embodiment of this invention the locus of the phase center is a circle centered on the boresight line to frequency modulate echo signals, the maximum deviation of such frequency modulation being related to the angular deviation of the target from the boresight line and the angular position of the phase center when minimum or maximum deviation occurs being related to the azimuthal position of the target. This particular scanning procedure is hereinafter referred to as "cylindrical" scan. In other embodiments of this invention the phase center of the receiving elements is moved in a noncircular path in such a manner that such center periodically, and alternatively, moves forward, or away from, a target, the magnitude of such movement being dependent on the angular deviation of the target from the boresight line of the radar antenna.

For a more complete understanding of the concepts of this invention reference is now made to the following description of embodiments of the invention illustrated in the accompanying drawings in which:

FIGS. 1A, 1B, 2A and 2B are sketches illustrating the principles of this invention when the phase center of a receiving antenna is moved in a circular path about the boresight line of such an antenna, FIGS. 1A and 1B being applicable to a target in the far field on the boresight line and FIGS. 2A and 2B being applicable to a target off the boresight line;

FIG. 3 is a drawing, greatly simplified and exaggerated, of a radar system having a cylindrical scan;

FIGS. 4A, 4B, 5A and 5B are sketches illustrating the principles of this invention when the phase center of a receiving antenna is moved to trace a diamond shape around the boresight of such antenna;

DESCRIPTION OF THE PREFERRED EMBODIMENTS

Figure 6:
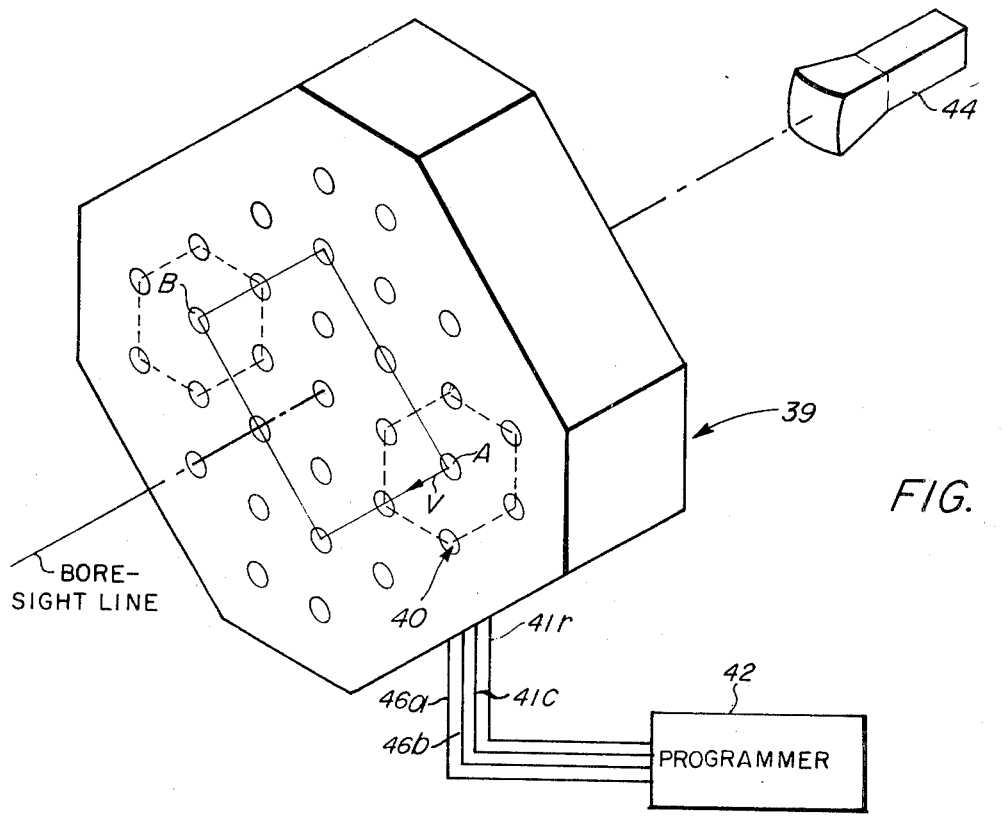
FIG. 6 is an illustration of a phased array which may be operated to derive the diamond scan shown in FIGS. 4A and 5A.

Referring now to FIGS. 1A and 1B in particular, it may be seen that the phase center, rotating in the orthogonal plane at a constant angular velocity, $w$, and at a distance, r, from the boresight line, x, traces, in the plan view shown in FIG. 1A, a circle 11. The instantaneous position of the phase center, taking point A as the starting point of each revolution of the phase center, obviously may be defined in terms of r and the sine of the angle b. Similarly, as indicated in FIG. 1B, it may be seen that the phase center moves, when viewed from above as illustrated from point A to B, the instantaneous velocity, v, of the phase center being:

$$v = wr \sin b. \qquad \text{Eq. (1)}$$

As shown in FIG. 1B, there is no component of velocity parallel to the boresight line. It follows then that the motion of the phase center between points A and B has no effect on signals (not shown) from a source, S1, on the boresight line in the far field.

Referring now to FIGS. 2A and 2B, it may be seen that a different situation obtains when signals (not shown) from a source S2 angularly displaced from the boresight line by an angle a are received. Thus, as shown in FIG. 2A, the circular path of the phase center is foreshortened, as viewed from the source S2, to form an ellipse. The amount of foreshortening is a function of the angular deviation, a, of the line of sight of the source, S2, and the boresight line. As shown in FIG. 2B, the motion of the phase center between points A and B results, in this case, in a component of motion of the phase center toward and away from the source S2. The instantaneous velocity of such component is the well-known Doppler velocity, $V_d$, and is:

$$V_d = v \sin a \qquad \text{Eq. (2)}$$

Substituting the value of v of Eq. (1) in Eq. (2) results in:

$$V_d = wr \sin b \sin a \qquad \text{Eq. (3)}$$

It is evident that, if the angular velocity, w, is high as compared to the rate of change of the angular deviation, a, (a condition which always exists when the source S2 is in the far field), the Doppler velocity, $V_d$, is dependent upon sin b in Eq. (3). It is also evident that the Doppler velocity, $V_d$, varies from zero through a negative maximum back to zero through a positive maximum back again to zero during each revolution of the phase center. The points of inflection of the Doppler velocity, $f_d$, always lie in the plane defined by the boresight line and the line of sight to the source, S2, and the maxima always lie in the orthogonal plane. Further, it is evident from Eq. (3) that the maxima of the Doppler velocity, $f_d$, (for constant angular velocity, w, and radius, r, of the phase center) are dependent on sin a. It follows, then, that Doppler shift in the signals from the source, S2, caused by the motion of the phase center frequency modulates such signals, the deviation of such modulation being indicative of the angular deviation of the source S2.

Referring now to FIG. 3, an exemplary radar system according to this invention may be seen to include a transmitter 21 and a receiver 23, each mounted on a rotatable member 25 and connected to a directional antenna 27, 29 as indicated. Directional antenna 27 is mounted in any convenient manner (not shown) so that the centerline of the beam therefrom (not shown) corresponds with the axis of rotation of rotatable member 25, i.e., the boresight line. Directional antenna 29 is similarly mounted, except that the centerline of its beam (not shown) is parallel to the axis of rotation of the rotatable member 25. The distance from the centerline of the beam, or the phase center of directional antenna 29, corresponds to the distance r shown in FIGS. 1A, 2A. A power source 31 and a utilization device 33 are connected through slip rings (not numbered) to the transmitter 21 and the receiver 23 to supply power to each and to display or otherwise use the signals out of the receiver 23 during operation. Rotation of the rotatable member 25 at an angular velocity, w, corresponding to the angular velocity w indicated in FIGS. 1A and 2A is accomplished here by a motor 35 through a gear train 37. To complete the system, an azimuthal reference generator 39 is disposed to produce a reference signal each time the phase center of the directional antenna 29 is in a position corresponding to position A in FIGS. 1A and 2A. The azimuthal reference generator 39 may take any known form; in its simplest form as indicated it may consist of a switch contactor 39a which is arranged to contact with a switch contactor 25a mounted on the rotatable member 25 to produce a signal. Rotation of the rotatable member 25 at an angular velocity, w, corresponding to the angular velocity w indicated in FIGS. 1A and 2A is accomplished here by a motor 35 through a gear train 37. To complete the system, an azimuthal reference generator 39 is disposed to produce a reference signal each time the phase center of the directional antenna 29 is in a position corresponding to position A in FIGS. 1A and 2A. The azimuthal reference generator 39 may take any known form; in its simplest form as indicated it may consist of a switch contactor 39a which is arranged to contact with a switch contactor 25a mounted on the rotatable member 25 to produce a signal.

The transmitter 21 may be of any type operating at any frequency. For convenience here it is assumed that transmitter 21 is a cw transmitter. The receiver 23 may be a conventional FM receiver for signal frequencies of interest. Implicit here is that the receiver 23 include a limiter (not shown) to eliminate AM modulation of echo signals. It should be noted, however, that a limiter is not essential to the invention because the FM modulation of the echo signals contains the information to be derived. The shape of the beams from directional antennas 27, 29 is not an essential feature of the invention. The angular velocity, w, of the phase center of directional antenna 29 and the displacement thereof from the boresight line (the distance r) may be varied within wide limits depending on the Doppler shift frequency desired to be impressed on "off boresight" targets and the frequency of operation.

In operation, energy from the directional antenna 27 is propagated through space to illuminate targets within a beam. Each such target in turn reflects a portion of the propagated energy back to the radar system to the directional antenna 29. For returned energy from targets in the far field, the wavefronts are planar. It follows, then, that if the returns are from a target on the boresight line, the rotation of the directional antenna 29 has no effect on such signals, whether or not there is a Doppler shift impressed thereon by reason of target motion relative to the radar system. On the other hand, as illustrated in FIGS. 2A and 2B, returns from a target off the boresight line are FM modulated periodically by reason of the rotation of the directional antenna 29, the period of such modulation being dependent on the angular velocity, w. With w, the distance r and the angular position of the phase center known, the deviation of the modulation signal then is dependent on the angular deviation of the target from the boresight line.

It will be noted here that the directional antenna 27 is not essential to the invention. Thus, such antenna could be eliminated and targets illuminated from a separate radar. Alternatively, directional antennas 27, 29 could be combined in a conventional manner so that the system would work as a conventional "two-way" Doppler system. That is, with the distance r and the angular velocity of the phase center held constant, the deviation of the modulation of echo signals would be twice the deviation of the illustrated system.

Referring now to FIGS. 4A, 4B, 5A and 5B, it may be seen that a noncircular movement of the phase center of a directional antenna at a distance from the boresight line is also useful in determining angular deviation of a target. Thus, as illustrated in FIGS. 4A and 4B, the phase center of a directional antenna may be moved at a constant linear velocity, V, from point A to point B and back to point A to form a diamond-shaped path. The phase of signals (not shown) from a target, $S_1$, in the far field of, and on the boresight line of, such antenna is invariant, as indicated in FIG. 4B. With respect to a target, $S_2$, removed from the boresight line by an angle a, the linear velocity of the phase center about the boresight line is effective to create a Doppler velocity, i.e., there is a component of motion along the line of sight between the target $S_2$ and the directional antenna. As indicated in FIG. 5B, the Doppler velocity is equal to the product of the linear velocity, $V_1$, and the sine of the angle a. It will be noted here that when the phase center follows a non-circular path there will be more than two points of inflection of the Doppler velocity during each revolution of the phase center if the line from point A to point B is not in the plane defined by the boresight line and the line of sight to the target, $S_2$. It will also be noted that the Doppler velocity caused by movement of the phase center does not, in the present example, vary continuously when the line from point A to point B lies in the plane defined by the boresight line and the line of sight to the target $S_2$, but rather changes abruptly from a closing to an opening Doppler velocity (at point A) and from an opening to a closing velocity (at point B). It follows from the foregoing, then, that the line defined by points A and B may be moved into the plane defined by the boresight line and the line of sight between target $S_2$ and the directional antenna by rotating the latter about its boresight until there are two points in each revolution of the phase center at which the Doppler velocity changes sign. The amount of rotation required is a measurement of the azimuthal position of the target, $S_2$.

Figure 6A:
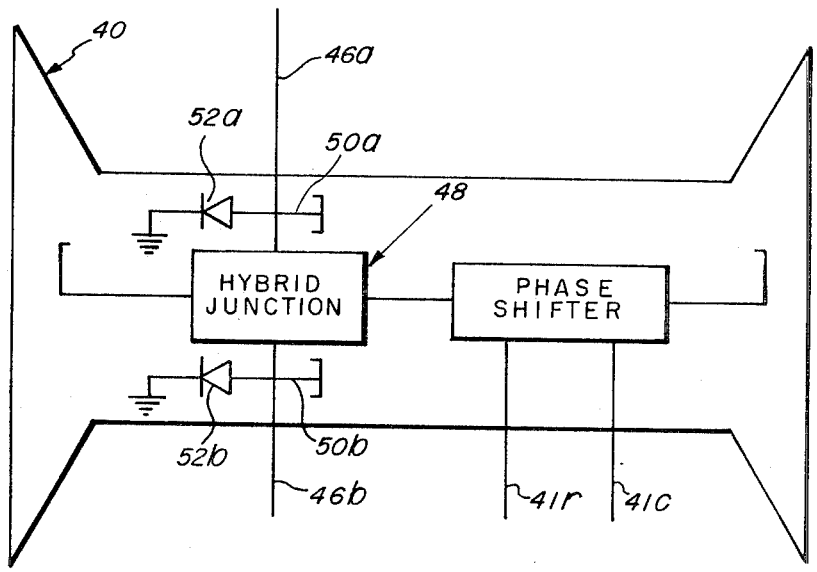
FIG. 6A is a sketch of a typical phase shifter.

Referring now to FIGS. 6 and 6A, it may be seen that scanning of the phase center as in FIGS. 4A and 5A may be accomplished with a phased array antenna. Thus, in FIG. 6, a planar array 39 of antenna elements 40 (a representative one being shown schematically in FIG. 6A) may be formed by mounting such elements in any convenient manner in rows and columns. Each one of the antenna elements 40 is, in accordance with control signals on lines 41r, 41c from a programmer 42, actuated in a conventional manner to focus signals from targets (not shown) in the far field on a receiving element 44, as a horn located on the boresight line of the planar array 39. Such focused signals are then conducted to a receiver (not shown) and processed as described hereinbefore. It should be noted here that, for convenience, it has been assumed that no deflection of the boresight line of the planar array 39 has been shown; it is obvious, however, that the row and column control signals from the programmer 42 may be changed to permit deflection as desired.

It is evident that if a portion, but not all, of the antenna elements 40 are permitted to pass received energy, the phase center of the planar array 39 will be shifted from the boresight line to a point removed from the boresight line. Thus, for example, if the antenna elements 40 shown connected by dotted lines at the left of the planar array 39 pass signals, the phase center is shifted to point B; and other selected groups of antenna elements 40 may be actuated to cause the phase center to move between points A and B as indicated.

Referring now to FIG. 6A along with FIG. 6, it may be seen that each one of the antenna elements 40 may be caused to change from a condition in which signals may be passed to a condition in which signals are blocked in response to appropriate control signals from the programmer 42 over lines 46a, 46b. Thus, each one of the antenna elements 40, in addition to the conventional input and output sections (not numbered) and phase shifter (not numbered), includes a hybrid junction 48 whose conjugate arms are each terminated in a quarter-wave short circuit 50a, 50b. A diode 52a, 52b, each of which is normally biased to be conducting by a signal from the programmer 42 over, respectively, line 46a or 46b, provides a termination for each one of the conjugate arms, which termination ordinarily removes the quarter-wave short circuit 50a, 50b as shown. When the signal on line 46a, 46b is removed, diodes 52a, 52b cease to conduct and each one of the quarter-wave short circuits 50a, 50b is placed in circuit with one of the conjugate arms. As is well known, destructive interference then occurs between the signals reflected back from the conjugate arms and no signals pass to the output arm of the hybrid junction 48. Obviously, then, by selectively actuating the diodes 52a, 52b associated with certain ones of the hybrid junctions 48 echo signals may be permitted to pass through different portions of the planar array 39.

It will be obvious to one of skill in the art that the phase center of a phased array antenna may be moved about the boresight line in a circular path in the manner shown in FIG. 3. As such movement is effected, the phased array antenna will then operate in the same manner as the antenna shown in FIG. 3. In other words, the concept of moving the phase center of an antenna in a circular path is applicable to a phased array antenna.

Having described two antennas according to the invention, the contemplated method becomes clear. That is, the method contemplates, for the determination of angular deviation of a target from the boresight line of an antenna, the steps of (a) moving, through a predetermined path, the phase center of an antenna about the boresight line thereof; (b) receiving and processing signals from all targets within the receiving beam of the antenna; and, (c) distinguishing between signals from individual ones of the targets by reason of differences in the frequency modulation of the different signals. It will be noted here that, whether the signals received are from targets in the main beam of the antenna or are from targets in any sidelobe, the just described method is applicable. The contemplated method additionally includes the concept of determining the azimuthal position of targets by determining the angular position of the moving phase center from a reference point when the deviation of the modulation signal is either zero or a maximum.

Having described a preferred embodiment of this invention, it is evident that other embodiments incorporating its concepts may be used. For example, the embodiment shown in FIG. 3 could be modified by substituting a second receiver for the transmitter 21. If this were to be done, then reference signals which include the Doppler frequency shift due to target motion would be obtained. Such reference signals would be useful in cases where the Doppler frequency shift due to phase center motion and the Doppler frequency shift due to target motion are near one another. Alternatively, additional receiving elements could be rotated to produce signals which are in anti-phase to, in quadrature or at intermediate phase relationship with the signals out of receiver 23. Such signals would be useful in precisely determining the time at which inflection of the Doppler frequency shift due to phase center motion occurs.

Still further, although the invention has been shown and described with motion of the phase center in a plane orthogonal to the boresight line of a directional antenna, the concept of the invention embraces also the idea of moving the phase center of the directional antenna cyclically along the boresight line. If such motion is effected the maximum Doppler frequency shift due to phase center motion would be impressed on signals from targets on the boresight line and a lesser Doppler frequency shift would be impressed on signals from targets off the boresight line.

Furthermore, even though the invention has been described in connection with a radar system, the concept of the invention may be used in other kinds of systems, as sonar systems, wherein measurement of angular deviation of targets from boresight is useful.

It is felt, therefore, that this invention should not be restricted to its disclosed embodiments but rather should be limited only by the spirit and scope of the appended claims.

What is claimed is:

1. In a target tracking system, using a directional antenna for receiving signals from targets within the beam of such antenna and phase modulating each one of such signals in accordance with the angular deviation of the line of sight to each one of such targets from the boresight line of such antenna, the combination comprising:
    a. at least one receiving element having a phase center spaced from such boresight line; and,
    b. phase center moving means for cyclically moving such phase center with respect to such boresight line, thereby periodically to impress, on the signals received from each one of such targets, a phase shift corresponding to the motion of such phase center along the line of sight to each one of such targets and indicative of the angular deviation of the line of sight to each one of such targets from the boresight line of such directional antenna.

2. The combination as in claim 1 wherein the phase center moving means is adapted to move the phase center of the at least one receiving element in a plane orthogonal to the boresight line, the locus of the path of such phase center being a circle centered at the boresight line and the angular velocity of the phase center being substantially constant.

3. The combination as in claim 2 having, additionally:
    a. means for continuously detecting such phase shift as may be impressed on the signals received from each one of such targets; and,
    b. means for measuring the maximum phase shift of each one of such signals to determine the angular deviation of the line of sight of each one of the targets from the boresight line of the directional antenna.

4. The combination as in claim 3 having, additionally: means for determining the length of the arc on the circle making up the locus of the phase center between a reference point on such circle and the point thereon at which the maximum phase shift is impressed on each one of the signals received from each one of the targets.

5. In a target tracking system, using a directional antenna for receiving signals from targets within the beam of such antenna and phase modulating each one of such signals in accordance with the angular deviation of the line of sight to each one of such targets from the boresight line of such antenna, the combination comprising:
    a. a phased array of antenna elements;
    b. means for selectively actuating different ones of the antenna elements making up the phased array to displace the phase center of the actuated ones of the antenna elements from the boresight line of the entire phased array; and,
    c. phase center moving means for cyclically moving such phase center around the boresight line, thereby periodically to impress, on the signals received from each one of such targets, a phase shift corresponding to the motion of such phase center along the line of sight to each one of such targets an indicative of the angular deviation between the line of sight to each one of such targets from the boresight line of such directional antenna.

6. The combination as in claim 5 having, additionally:
    a. means for continuously detecting such phase shift as may be impressed on the signals received from each one of such targets; and
    b. means for measuring the maximum phase shift of each one of such signals to determine the angular deviation of the line of sight of each one of the targets from the boresight line of the directional antenna.

7. In a target tracking system using a directional antenna for transmitting signals to illuminate targets within the beam of such antenna and phase modulating the echo signals from each one of such targets in accordance with the angular deviation of the line of sight to each one of such targets from the boresight line of such antenna, the combination comprising:
- a. a transmitting element having a phase center spaced from such boresight line; and
- b. phase center moving means for cyclically moving such phase center with respect to such boresight line to impress, on the signals from such transmitting element to each one of such targets, a periodic phase shift corresponding to the motion of such phase center along the line of sight to each such target and indicative of the angular deviation of the line of sight to each one of such targets from the boresight line of such directional antenna.

8. The method of determining the angular deviation between the boresight line of a directional antenna and the line of sight from such antenna to a target in the beam therefrom, such method comprising the steps of:
- a. displacing the phase center of the directional antenna from the boresight line thereof;
- b. moving such phase center about such boresight line; and,
- c. measuring the maximum phase shift impressed on signals from the target to determine the angular deviation of the line of sight therefrom and the boresight line.

9. The method of claim 8 wherein the step of moving such phase center about such boresight line comprises moving, at a constant angular velocity, such phase center along the circumference of a circle centered on the boresight line, the plane of such circle being orthogonal to such boresight line.

10. For use with a pulsed target detection system whereby angular deviation between the boresight line of a transmit/receive antenna and the line of sight from such antenna to a target in the beam thereof, such method comprising the steps of:
- a. displacing the phase center of the transmit/receive antenna from the boresight line thereof;
- b. rotating, at a constant angular velocity, such phase center along the circumference of a circle centered on such boresight line, such circle being in a plane orthogonal thereto;
- c. alternately transmitting pulses of energy to illuminate a target in the beam of the transmit/receive antenna and receiving echo signals from such target; and,
- d. measuring the maximum phase shift impressed on the echo signals and having a period equal to the period of rotation of the phase center.

* * * * *